A. W. SCHENKER.
COCK.
APPLICATION FILED NOV. 3, 1920.
1,384,159.
Patented July 12, 1921.
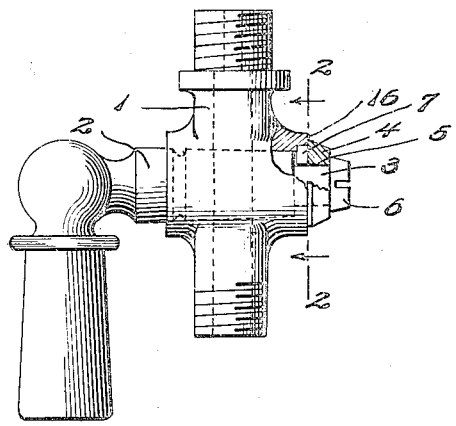
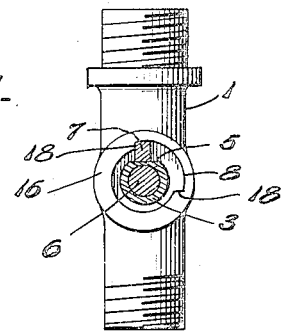
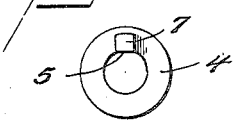
A. W. Schenker, Inventor
By John Boyle Jr, Attorney

UNITED STATES PATENT OFFICE.

ABRAHAM W. SCHENKER, OF BROOKLYN, NEW YORK.

COCK.

1,384,159. Specification of Letters Patent. Patented July 12, 1921.

Application filed November 3, 1920. Serial No. 421,524.

*To all whom it may concern:*

Be it known that ABRAHAM W. SCHENKER, a citizen of the United States, residing at Brooklyn, in the county of Kings and State of New York, has invented certain new and useful Improvements in Cocks, of which the following is a specification.

My invention relates to improvements in gas, air, water and oil cocks and one of the objects of the invention is to provide a device of this character with a stop for limiting the movement of the turning plug and which will not readily get out of order, will be simple in construction, easily assembled and susceptible of quantity production.

In the ordinary type of gas cock, the stop on the turning plug is formed by inserting a pin in an opening in the plug at the proper point. Sometimes this pin becomes loosened and drops out of place with the result that the plug may unintentionally be turned to such a position as to permit escape of the fluid.

One of the objects of my invention is to design a cock of this type, which will overcome this defect.

Another object of the invention is to design the parts of the cock so that they may be die-cast, thus permitting of quantity production and eliminating the necessity of hand finishing or polishing as in the case where the parts are cast in sand molds.

Another object of the invention is the design and location of the stop so that it will be invisible, the gas cock thus having a finished external appearance.

Another object of the invention is the location and protection of the stop, so that dirt will not accumulate and pack around it and interfere with the proper closing of the cock.

With these and other objects in view, my invention consists of certain novel and peculiar features of construction and combination of parts as hereinafter described and claimed, and in order that it may be clearly understood reference is to be had to the accompanying drawing in which;

Figure 1 is an elevation of a gas cock, with a fragmentary section showing the stop arrangement;

Fig. 2 is a section of the line 2—2 looking in the direction of the arrows;

Fig. 3 is a plan view of the washer provided with the stop.

Referring to the drawings for a more complete disclosure of the invention, 1 is the barrel of the cock having a tapered turning plug 2 therein. The smaller end of the plug is reduced in diameter to provide a shank 3. Fitting over the shank is a washer 4 which is keyed thereto in any suitable manner such as shown at 5. The shank is internally threaded to receive a screw 6 for holding the washer in adjusted position up against the end bearing 16 of the barrel of the cock, so that the plug is securely held from being withdrawn from its bearing.

For providing a means to limit the turning movement of the plug, the washer 4 is provided on its inner surface with a stop 7. This stop may be and preferably is made integral with the washer. When made integral therewith it may be fabricated in large quantities by the die casting operation, or by stamping.

For coöperating with the stop 7 a groove 8 having shoulders 18 is provided on the inner side of the body of the valve.

It will be noted that when the valve is assembled that the stop and its coöperating groove and shoulders are hidden from view and that these parts are inclosed and thus protected from accumulating dust or dirt.

The arrangement and construction of the stop is such as to totally eliminate the chances of turning the plug unintentionally beyond its closed position through failure of the stop to operate as intended.

From the above description it will be apparent that I have produced a device of the character described which possesses all the features enumerated as desirable and while I have illustrated and described the preferred form of my invention, it will be understood that I reserve the right to all changes properly falling within the spirit and scope of the appended claims.

While I have described the application of my invention in connection with a gas cock, I do not intend to limit it solely to that use, but it can be applied to any valve of a similar type.

I claim:

1. In a device of the character described, a rotary plug, a casing in which the plug rotates, a washer secured to the plug and provided with a stop on its inner face extending parallel to the axis of the plug and fixed shoulders on the inner side of the casing for coöperating with the said stop.

2. In a device of the character described, a rotary plug, a casing in which the plug rotates, a washer secured to the plug and provided with a stop, fixed shoulders on the inner side of the casing for coöperating with the said stop, the flat face of the washer overlying and engaging the end of the casing.

3. In a device of the character described, a rotary plug, a casing in which the plug rotates, a washer secured to the plug, a stop extending parallel to the axis of the plug and interposed between the inner face of the washer and the inner side of the casing to limit the turning movement of the plug.

4. In a device of the character described, a rotary plug, a casing in which the plug rotates, a washer secured to the plug, and provided with a stop on its inner face extending parallel to the axis of the plug, shoulders on the inner side of the casing for coöperating with the said stop, the said washer overlying and engaging the end of the casing.

5. In a device of the character described, a rotary plug, a casing in which the plug rotates, a washer secured to the plug, a stop extending parallel to the axis of the plug and interposed between the inner face of the washer and the inner side of the casing to limit the turning movement of the plug, the said washer overlying and engaging the end of the casing.

In testimony whereof I affix my signature.

ABRAHAM W. SCHENKER.